United States Patent Office 2,847,350
Patented Aug. 12, 1958

2,847,350

PREPARATION OF HIGHLY ACTIVE THROMBOPLASTIN

Heron O. Singher, Plainfield, and Emanuel A. Swart, Somerville, N. J., assignors to Ortho Pharmaceutical Corporation, a corporation of New Jersey No Drawing. Application May 27, 1954
Serial No. 432,897

6 Claims. (Cl. 167—74)

This invention relates to a highly active, stable, thromboplastic material and a method for its preparation, and more particularly relates to a mixture of thromboplastic material obtained by the trituration of rabbit brain tissue with an organic solvent, thromboplastic material obtained by the extraction of rabbit brain or lung tissue or mixtures thereof with a buffered aqueous alcohol solution containing an amino acid, and a substance isolated from horse, human, bovine, or rabbit plasma capable of increasing the activity of thromboplastic material.

Thromboplastin has accepted value for use in the determination of prothrombin time, which is a measure of the amount of prothrombin present in a tested blood sample. The determination of prothrombin time is useful clinically, for the fact that it varies with a variety of clinical situations has been well established. It is known that vitamin deficient diets may result in prolonged prothrombin time. Biliary diseases frequently result in prolonged prothrombin time and are considered to be related to impaired vitamin K absorption. Impaired liver function results in prolongation of prothrombin time. A variety of drugs such as the salicylates and especially Dicumarol affect the prothrombin time to a degree considered sufficient to be of clinical significance.

The two-stage theory of Morawitz for the mechanism of blood coagulation postulates, as a first stage, the interaction of prothrombin, calcium ion, and thromboplastin which results in the formation of thrombin and, as a second stage, the reaction of thrombin with fibrinogen to form fibrin. Fibrin fibers are largely responsible for the characteristic properties of clotted blood. It has been shown that the addition to blood of small amounts of thromboplastin can accelerate clotting time, generally referred to as prothrombin time, from the usual several minutes down to a few seconds. Thromboplastin, otherwise known as the platelet-tissue factor, is essential to the blood clotting mechanism but has not been definitely identified chemically. The mechanism of the activity and function of thromboplastin in blood clotting is not settled but most workers believe it to be enzymatic and that thromboplastin acts to catalyze the conversion of prothrombin to thrombin probably through an intermediate prothrombin - thromboplastin - calcium complex. Since thrombin is a protein essential to the formation of fibrin and thromboplastin is necessary for the conversion of prothrombin to thrombin, the measurement of prothrombin time, wherein a standardized preparation of thromboplastin is used, has come to be considered as yielding information of great clinical value.

It is an object of this invention to provide an improved thromboplastic material.

It is another object of this invention to provide a method for preparing a standardized preparation of thromboplastic material having reproducible activity based on determinations of prothrombin time found with normal, oxalated, human plasma.

It is another and further object of this invention to provide a method for the preparation of thromboplastic material of high activity for use in determining prothrombin time.

Other objects and particular advantages of the invention will be apparent from the following description and exemplary disclosures.

The objects of this invention are accomplished and a highly active, stable, improved, thromboplastic material is provided by suspending in 0.85 percent sodium chloride solution, a mixture of a first thromboplastic material prepared by the trituration of rabbit brain tissue with an organic solvent such as acetone; a second thromboplastic material obtained by the extraction of finely divided rabbit brain or lung tissue, or mixtures thereof, with a buffered aqueous alcohol solution containing a low molecular weight amino acid, and a substance isolated from horse, human, bovine, or rabbit plasma which is capable of increasing the activity of thromboplastic material, the latter substance being obtained by successively extracting deprothrombinized horse, human, bovine, or rabbit plasma with two buffered aqueous alcohol solutions, the first aqueous alcohol solution being buffered within the pH range of from 4 to 5, and the second being buffered at a pH range of from 6 to 8 and containing an alkali metal salt of an amino acid. The suspended mixture is incubated at 45°–50° C. for about 20 minutes and centrifuged, calcium chloride is added to the supernatant, the mixture is again centrifuged and the supernatant is lyophilized. The lyophilized solid material is stable and has a high thromboplastic activity as determined according to our modification of the Shapiro-Weiner method.

More particularly, the mixture contains, in suspension in 10 milliliters of 0.85 percent sodium chloride solution, 50 to 200 milligrams of the first thromboplastic material, 20 to 100 milligrams of the second thromboplastic material, and 5 to 100 milligrams of the substance isolated from horse, human, bovine or rabbit plasma capable of increasing the activity of thromboplastic active material. The latter substance is preferably isolated from rabbit plasma. If the amounts of first and second thromboplastic materials and substance isolated from plasma in the suspension are not within the ranges given above, the thromboplastic material prepared therefrom has an increased prothrombin time. It is preferred that the suspension in 0.85 percent sodium chloride solution contain for each 10 milliliters thereof, a mixture of 100 to 110 milligrams of the first thromboplastic material, 40 to 50 milligrams of the second thromboplastic material and 5 to 10 mgs. of a substance isolated from rabbit plasma capable of increasing the activity of thromboplastic material. The aqueous calcium chloride solution is added to supernatant from the first centrifugation in an amount sufficient to bring the calcium ion concentration in the solution to 0.004 to 0.015 molar, and preferably to 0.006 molar. If the concentration of calcium ion is less than 0.004 molar, there is incomplete complex formation and, if the concentration of calcium ion is greater than 0.015 molar, the thromboplastic material obtained has increased prothrombin time.

Incubation of the suspended mixture in aqueous sodium chloride solution of the first and second thromboplastic materials and the substance isolated from horse, human, bovine, or rabbit plasma brings about a change in or an interaction between the suspended materials, probably chemical in nature, whereby a fraction having little if any thromboplastic activity and of large particle size may be removed by centrifugation. Addition of calcium chloride to the supernatant from the first centrifugation also brings about a change in the materials present in the supernatant or a chemical reaction between the materials, the result being that a material having little if any thromboplastic activity may be removed by a further centrifugation. The supernatant from the second centrifugation contains thromboplastic material having high activity and high stability in the lyophilized state.

The first thromboplastic material is prepared by the method of A. J. Quick which is described in "The Physiology of Hemostasis," Lea and Febiger, Philadelphia (1951), page 121, and comprises the trituration of rabbit brain tissue with an organic solvent such as acetone.

The second thromboplastic material is prepared by the extraction of rabbit brain or lung tissue, or mixtures thereof, with a buffered aqueous alcohol solution containing a low molecular weight amino acid and subsequent dialysis of the extracting solution containing thromboplastin against distilled water to remove low molecular weight inactive materials such as amino acid salts and inorganic salts. Rabbit brain or lung tissue or a mixture of the two may be finely divided by any suitable means such as a Waring Blendor which homogenizes the tissue. It is preferred, in order that the yield of thromboplastin be efficient and destruction of thromboplastin at a minimum, for the tissue to be finely divided or homogenized at a temperature not above 25° C. and preferably within the range of from −5° to 25° C., and that the step of finely dividing or homogenizing the tissue be accomplished in the presence of the extracting solution. When the tissue is homogenized in a Waring Blendor in the presence of the extracting solution, the homogenizing step has been found to be sufficiently thorough in as short a time as thirty seconds.

The solution used for extracting finely divided tissue in the process of our invention is a buffered aqueous alcohol solution. Ethanol or methanol may be the only alcohol in the extracting solution or a mixture of ethanol and methanol may be used. Alcohol or a mixture of alcohols may be present in the aqueous alcoholic extracting solution in an amount from about 5 to 20 percent by volume. If the concentration of alcohol in the extracting solution is less than about five percent by volume, the thromboplastic active material is not obtained in the extracting solution in a state which will allow satisfactory separation thereof from the unextracted residual tissue, and if the concentration of alcohol in the extracting solution is greater than about twenty percent by volume, the solubility of the thromboplastic active material in the extracting solution is significantly decreased. The aqueous alcohol solution is buffered at a pH within the range of from 5 to 8 but the preferred buffering range is 5.5 to 6.5. If the aqueous alcohol solution is buffered at a pH below 5, the amount of thromboplastic active material extracted from tissue is significantly decreased because its solubility in the extracting solution is markedly lower, and if the aqueous alcohol solution is buffered at a pH above 8, significant amounts of inactive tissue components are present in the extracting solution. It is necessary that an alkali metal salt of a low molecular weight amino acid, and preferably an alkali metal salt of an amino acid having not more than nine carbon atoms, such as alanine, glycine, proline or serine be present as an active part of the buffer system in an amount within the range of from 0.01 to 6.0 percent by weight of the buffered aqueous alcohol extracting solution; the preferred amount of low molecular weight amino acid is from one to two percent by weight. The presence in the extracting solution of the low molecular weight amino acid results in a significant increase in the amount of thromboplastic material extracted by the solution provided the amino acid is present in an amount within the range of from 0.01 to 6.0 percent by weight; if the amount is below this range, the increase in the amount of thromboplastic material extracted from tissue by the solution is not significant, and if the amount is above this range the material dissolved in the extracting solution results in a longer clotting time as measured by our modification of the Shapiro-Weiner method. Any acid buffer system effective over a pH range of 5 to 8 may be used to adjust the pH of the extracting solution. Specific acid buffer systems found suitable contain salts of acids such as phosphoric acid, amino acids, acetic acid and citric acid. An alkali metal hydroxide may be used in conjunction with the acid buffer systems to adjust the pH of the extracting solution to the desired level.

The amount of buffered aqueous alcohol solution used in the extraction may vary widely but for most efficient extraction of thromboplastin from the tissue it has been found desirable to use at least four milliliters of extracting solution for each gram of tissue to be extracted. The finely divided tissue in association with the buffered aqueous alcohol solution is thoroughly stirred at a temperature not above 25° C. and preferably not above 5° C. and centrifuged. The supernatant is filtered to remove any fat present and dialyzed against distilled water not above 25° C. preferably at a temperature not above 5° C. At a temperature above 25° C. a significant amount of thromboplastic active material is destroyed.

The substance obtained from horse, human, bovine, or rabbit plasma capable of increasing the activity of thromboplasic material may be prepared as follows: Horse or rabbit plasma to which a heparin sodium solution has been added to prevent coagulation, is centrifuged in order to obtain the plasma. The plasma is slurried with two to five percent, and preferably five percent, of barium sulfate, the barium sulfate being expressed in grams, and the plasma in cubic centimeters. At least two percent of barium sulfate is required to remove all the prothrombin, and the presence of more than five percent results in a mixture of such a consistency that physical handling thereof is extremely difficult. The slurry is stirred for one hour in order that the maximum amount of prothrombin be completely adsorbed, and is then centrifuged. It is preferred that the adsorption be repeated to insure complete removal of prothrombin, preferably with the same amount of barium sulfate, and upon centrifugation after the second adsorption, the plasma is prothrombin free. Albumin and alpha-globulins are extracted from the prothrombin-free plasma by the addition of a first buffered aqueous alcohol solution and centrifugation. The alcohol may be ethanol, methanol, or a mixture of methanol and ethanol and may be present in an amount of from about 15 to about 30 percent by volume, but it is preferred that the amount be about 25 percent. If the amount is less than about 15 percent, a significant amount of the desired plasma fraction remains in solution, and if the amount is greater than about 30 percent a substantial amount of inactive substances is present in the precipitate. The first aqueous alcohol solution is buffered within the pH range of from 4 to 5, the preferred pH being 4.2 to 4.6. Buffering below a pH of 4 results in incomplete solution of albumin in the extracting solution and buffering above a pH of 5 results in a significant amount of the desired plasma fraction being lost in the extracting solution. In general, any buffer system capable of maintaining the pH of the mixture of the first aqueous alcohol solution and prothrombin-free plasma within the range of 4 to 5 may be used. The preferred buffer system is sodium acetate-acetic acid; however, buffer systems such as sodium succinate-succinic acid, and sodium acid phthalate-phthalic acid, have been found suitable.

The volume of first aqueous alcohol solution used may vary widely, but the most efficient removal of albumin and alpha-globulin from the prothrombin-free plasma is accomplished when the volume is three to five times the volume of the plasma. It is preferred that the volume of the first aqueous alcohol solution be about four times the volume of the plasma.

It is necessary that the extraction and removal by centrifugation of albumin and alpha-globulins in solution in the first aqueous alcohol solution be accomplished at a low temperature in order that they be efficiently removed from the plasma. Extraction and removal at a higher temperature results in denaturation of albumin and alpha-globulins by the alcohol and incomplete removal thereof in the extracting solution. The prothrombin-free horse, human, bovine or rabbit plasma is cooled to 5 to 0° C., and preferably to 0° C., and the first aqueous alcohol solution, which has been cooled to −5 to −10° C., is slowly added with stirring and during the course of the addition, the temperature of the mixture is maintained between 0 and −5° C., and preferably at about −5° C. After addition is completed the mixture is stirred for about 30 minutes and during this time the temperature of the mixture is maintained at 0 to −5° C., and preferably at −5° C. Immediately after stirring is discontinued, the mixture is centrifuged and during the centrifugation the temperature is maintained at 0 to −5° C., and preferably −5° C. The supernatant, which consists mainly of albumin and alpha-globulins is discarded and the residue is extracted with a second buffered aqueous alcohol solution to obtain the desired plasma fraction.

The alcohol in the second aqueous alcohol solution may be ethanol, methanol, or a mixture of ethanol and methanol and the alcohol, or mixture of alcohols, is present in an amount from 5 to 20 percent by volume and preferably in an amount of about 16 percent by volume. The second aqueous alcohol solution is buffered at a pH within the range of from 6 to 8, and preferably 6.8 to 7.2. A solution buffered outside this pH range extracts significantly less of the desired plasma fraction from the residue of the first extraction. The second aqueous alcohol solution contains alkali metal salt of an amino acid having not more than six carbon atoms, such as alanine, glycine, proline, or serine. In general, other amino acids are not sufficiently soluble in the second extracting solution. The alkali metal salt acts as a stabilizing agent for the material to be extracted from the plasma, as a solubilizer for beta- and gamma-globulins, and as an active part of the buffer system. The amino acid is present in an amount within the range of 4 to 6 percent by weight, and preferably 5.4 to 5.8 percent by weight. At a concentration less than 4 percent by weight, the solubilizing effect of the amino acid is significantly decreased; on the other hand, the solubilizing effect is not increased when the concentration is greater than 6 percent. Phosphates such as mono- or disodium phosphate are also present in the second aqueous alcohol solution as part of the buffer system and the pH of the solution is adjusted to the desired value with an alkali metal hydroxide. Any buffer system may be used which is effective within a pH range of 6 to 8.

The amount of the second aqueous alcohol solution used in the extraction of the albumin and alpha-globulin-free residue may vary widely but an amount of solution three to five times, and preferably four times, the volume of the original plasma in the most efficient recovery of the desired plasma fraction. The mixture of residue and second aqueous alcohol solution is stirred at a temperature of 0 to −5° C., and preferably at −5° C., for about 30 minutes, and then centrifuged and the residue from the centrifugation which consists mainly of beta-globulins and fibrinogen is discarded. The supernatant, which contains the desired plasma fraction, is filtered, dialyzed against distilled water at a temperature of 1 to 5° C., and the dialysate is lyophilized. The term "dialysate" as used in this specification designates the material which has failed to pass through the dialysis membrane). Denaturation of the desired plasma fraction is at a minimum when the temperature during dialysis is within the range of 1 to 5° C.

In order that those skilled in the art may better understand how the present invention may be carried into effect, the following examples are given by way of illustration but not by way of limitation.

*Example I*

In the preparation of the first thromboplastic material, according to the method of Quick; three clean rabbit brains weighing about 21 grams were placed in a glass mortar and covered with 30 cc. of acetone and 0.1 cc. of 0.2 molar sodium citrate. The brains were crushed and mashed with a glass pestle in a manner to avoid grinding. The acetone was poured off, 25 cc. of fresh acetone was added, and the brain tissue was again crushed and mashed. The second portion of acetone was poured off, 25 cc. of fresh acetone was added to the brain tissue and the brain tissue was carefully ground in the presence of the acetone. The acetone was poured off, another 25 cc. portion of acetone was added and the brain tissue was ground under the acetone until it was granular and non-adhesive. The residual brain tissue was filtered by suction, washed six times with 10 cc. portions of fresh acetone, dried by suction, transferred to a filter paper, and dried at 37° C. for thirty minutes. 3.5 grams of ivory-white, finely granular material was obtained.

In the preparation of the second thromboplastic material from the extraction of rabbit brain or lung tissue, or a mixture thereof, with a buffered aqueous alcohol solution containing a low molecular weight amino acid; 76 grams of frozen rabbit brain and 1440 grams of frozen rabbit lung were homogenized at 5° C. for one minute in the presence of 7600 ml. of an aqueous solution containing 150 ml. of an alcoholic solution per liter, prepared by adding 7.5 ml. of ethanol, 15 grams of glycine, 4.8 ml. of one molar aqueous sodium acetate solution, and 2.6 ml. of one molar aqueous acetic acid solution to 142.5 ml. of 95 percent ethanol. The homogenate was stirred for two hours at 5° C. and centrifuged at −5° C. for thirty minutes. The supernatant liquid was filtered, dialyzed against distilled water at 5° C. and lyophilized.

In the preparation of a substance from horse plasma capable of increasing the activity of thromboplastic material, fifty ml. of heparin sodium solution were added to 20 liters of horse blood and the mixture was centrifuged for 30 minutes at 25° C. Nine liters of the supernatant plasma were slurried with 450 grams of barium sulfate at 25° C., stirred for one hour and centrifuged. The supernatant was slurried with 450 grams of barium sulfate, stirred for one hour at 25° C. and centrifuged. The prothrombin-free plasma obtained, which had a volume of eight and one-half liters, was cooled to 0° C. Thirty-four liters of an aqueous alcohol solution buffered at a pH of 4.6 was cooled to a temperature of 0° C. and added to the plasma at such a rate that the temperature of the mixture throughout the addition was below 0° C. The mixture was stirred for 30 minutes at −5° C. after addition was complete and then centrifuged and the temperature of the mixture was maintained at a temperature of −5° during the centrifugation. The supernatant, which contained substantially all the albumin and alpha-globulins of the plasma, was discarded. The aqueous alcohol solution contained per liter, 12½ ml. of methanol, 237½ ml. of 95 percent ethanol, and 0.6 ml. of an acetate buffer solution prepared by diluting a mixture of 20 ml. of 4 molar sodium acetate and 40 ml. of 10 molar acetic acid to 100 ml. with water. The residue from the centrifugation was finely dispersed with a spatula in 34 liters of the aqueous alcohol extracting solution buffered at a pH of 7. The temperature of the extracting solution and residue during the dispersion was maintained at −5° C. and after dispersion was complete the mixture was stirred for 30 minutes at a temperature of −5° C. and centrifuged. The temperature of the mixture during the centrifugation was maintained at −5° C. The supernatant was filtered and dialyzed against distilled water. The temperature of the supernatant during filtration and dialysis was maintained at 5° C. The dialysate was lyophilized and 350 grams of solid were obtained. The solid had no demonstrable thromboplastic activity. The aqueous alcohol extracting solution contained, per liter, 8 ml. of methanol, 152 ml. of 95 percent ethanol, 56 grams of glycine, 3.12 ml. of a solution of sodium glycinate, prepared by dissolving 4.5 grams of glycine and 2.0 grams of sodium hydroxide in 100 ml. of water, 4 ml. of 0.5 molar disodium hydrogen phosphate, and 2.76 ml. of 0.5 molar monosodium dihydrogen phosphate.

A mixture containing 100 mgs. of the first thromboplastic material, 40 mgs. of the second thromboplastic material, and 10 mgs. of the substance isolated from horse plasma were suspended in 10 mls. of 0.85 percent sodium chloride solution, incubated at 50° C. for 20 minutes and centrifuged. 0.25 ml. of 0.25 molar aqueous calcium chloride solution was added to the supernatant and the mixture was centrifuged. The supernatant from the second centrifugation may be used in the determination of prothrombin time, may be lyophilized, in which form it is stable, and reconstituted with distilled water as desired for use in prothrombin time determinations.

*Example II*

In the preparation of a substance from rabbit plasma capable of increasing the activity of thromboplastic material, three ml. of heparin sodium solution were added to 1200 ml. of rabbit blood and the mixture was centrifuged for 30 minutes at 25° C. Six hundred twenty ml. of the supernatant plasma were slurried with 31 grams of barium sulfate at 25° C., stirred for one hour and centrifuged. The supernatant was slurried with 31 grams of barium sulfate, stirred for one hour at 25° C., and centrifgued. The prothrombin-free plasma obtained, which had a volume of 565 ml. was cooled to 0° C. Two thousand two hundred and sixty ml. of an aqueous alcohol solution buffered at a pH of 4.6 was cooled to a temperature of 0° C. and added to the plasma at such a rate that the temperature of the mixture throughout the addition was below 0° C. The mixture was stirred for 30 minutes at —5° C. after addition was complete and then centrifuged and the temperature of the mixture was maintained at a temperature of —5° during the centrifugation. The supernatant, which contained substantially all the alubumin and alpha-globulins of the plasma, was discarded. The aqueous alcohol solution contained per liter, 12½ ml. of methanol, 237½ ml. of 95 percent ethanol, and 0.6 ml. of an acetate buffer solution prepared by diluting a mixture of 20 ml. of 4 molar sodium acetate and 40 ml. of 10 molar acetic acid to 100 ml. with water. The residue from the centrifugation was finely dispersed with a spatula in 2260 ml. of the aqueous alcohol extracting solution buffered at a pH of 7. The temperature of the extracting solution and residue during the dispersion was maintained at —5° C. and after dispersion was complete the mixture was stirred for 30 minutes at a temperature of —5° C. and centrifuged. The temperature of the mixture during the centrifugation was maintained at —5° C. The supernatant was filtered and dialyzed against distilled water. The temperature of the supernatant during filtration and dialysis was maintained at 5° C. The dialysate was lyophilized and eight grams of solid were obtained. The solid had no demonstrable thromboplastic activity. The aqueous alcohol extracting solution contained, per liter, 8 ml. of methanol, 152 ml. of 95 percent ethanol, 56 grams of glycine, 3.12 ml. of a solution of sodium glycinate, prepared by dissolving 4.5 grams of glycine and 2.0 grams of sodium hydroxide in 100 ml. of water, 4 ml. of 0.5 molar disodium hydrogen phosphate, and 2.76 ml. of 0.5 molar monosodium dihydrogen phosphate.

A mixture containing 400 mgs. of the first thromboplastic material, 150 mgs. of the second thromboplastic material, both obtained according to the method of Example I, and 20 mgs. of the substance isolated from rabbit plasma were suspended in 40 mls. of 0.85 percent sodium chloride solution, incubated at 50° C. for 20 minutes, and centrifuged. One ml. of 0.25 molar aqueous calcium chloride solution was added to the supernatant and the mixture was centrifuged. The supernatant from the second centrifugation may be used in the determination of prothrombin time or may be lyophilized, in which form it is stable, and reconstituted with distilled water as desired for use in prothrombin time determinations.

The thromboplastic activity of the first and second thromboplastic materials and of the improved thromboplastic materials was determined by our modification of the Shapiro-Weiner method for determining prothrombin of blood, as described in a book entitled: "Coagulation, Thrombosis and Dicumarol," by Shapiro and Weiner, published in 1949 by the Brooklyn Medical Press, Brooklyn, New York.

A calcium-thromboplastin suspension of the first thromboplastic material was prepared in a test tube by adding 100 mgs. thereof to 10 ml. of 0.85 percent aqueous chloride solution, admixing by inverting the tube three or four times until a uniform suspension was obtained, keeping the suspension in a water bath at 46–50° C. for twenty minutes, centrifuging, cooling the supernatant to room temperature, adding 0.1 ml. of 0.25 molar calcium chloride solution to 4 ml. of the suspension, mixing as above, and centrifuging again.

A calcium-thromboplastin suspension of the second thromboplastic active material was prepared in the same way as above except 20 mgs. of the lyophilized material was added to 5 ml. of 0.85 percent aqueous sodium chloride solution in preparing the starting suspension.

Two-tenths ml. of each of the calcium thromboplastin suspensions prepared as above and two-tenths ml. of each of the supernatant liquids from the second centrifugation, prepared by Examples I and II, were each added to a separate 0.1 ml. portion of fresh, oxalated, human plasma, which had been prepared by the addition of 0.1 molar aqueous sodium oxalate solution to fresh, human blood in the proportion of one part sodium oxalate solution to nine parts of blood and centrifugation of the oxalated blood. The mixtures were agitated at 37° C. by tilting the test tubes containing them back and forth and timing the first appearance of a fibrin clot. Those containing the first and second thromboplastic materials alone showed clot formation in 17.8 seconds and 46.2 seconds, respectively, and the ones containing the supernatant liquids from the second centrifugation, prepared by Examples I and II, showed clot formation in 11.0 and 11.9 seconds respectively, after addition of the thromboplastic materials to plasma.

The substances isolated from horse and rabbit plasma had no demonstrable thromboplastic acitvity, as determined by our modification of the Shapiro-Weiner method.

It will be obvious to those skilled in the art that various changes may be made without departing from the spirit of the invention and therefore, it is to be understood that the invention is not limited to what is described in the specification and examples but only as indicated in the appended claims.

What is claimed is:

1. A method for preparing a highly active, stable thromboplastic material comprising the steps of: suspending in 0.85 percent aqueous sodium chloride solution a first thromboplastic material comprising a finely divided tissue residue resulting from the extraction of rabbit brain tissue with acetone; a second thromboplastic material prepared by the extraction of finely divided rabbit tissue, selected from the class consisting of brain and lung tissue, with an aqueous solution buffered at a pH within the range of 5–8 and containing an alcohol, selected from the group consisting of methanol and ethanol and mixtures thereof, in the amount of 5-20 percent by volume and 0.01-6.0 percent by weight of an amino acid having not more than nine carbon atoms, separation of the finely divided tissue from the extracting solution, dialysis of the extracting solution against distilled water; and lyophilization of the dialysate; and a substance capable of increasing the activity of thromboplastic material prepared at a low temperature throughout from prothrombin-free plasma selected from the class consisting of prothrombin-free horse, human, bovine, and rabbit plasma by adding to the prothrombin-free plasma three to five volumes of a first aqueous alcohol solution buffered at a pH of 4-5 and containing about 15-30 percent by volume of an alcohol selected from the class consisting of methanol and ethanol and mixtures thereof, stirring and centrifuging the mixture, separating the supernatant from the residue; and adding to the residue three to five volumes of a second aqueous alcohol solution buffered at a pH of 6-8 and containing 5-20 percent by volume of an alcohol selected from the class consisting of methanol and ethanol and mixtures thereof and 4-6 percent by weight of an alkali metal salt of an amino acid having not more than six carbon atoms, stirring and centrifuging the mixture, filtering the supernatant, dialyzing the filtered supernatant against distilled water, and lyophilizing the dialyzed supernatant; the suspension containing, for each ten milliliters of sodium chloride solution, 50-200 milligrams of the first thromboplastic material, 20-100 milligrams of the second thromboplastic material, and 5-100 milligrams of the substance capable of increasing the activity of thromboplastic material, incubating the suspension, centrifuging the incubated suspension, adding an amount of aqueous calcium chloride solution to the supernatant from the centrifugation sufficient to bring the calcium ion concentration therein to 0.004 to 0.015 molar, and centrifuging the supernatant containing calcium chloride.

2. A method for preparing a highly active, stable thromboplastic material comprising the steps of: suspending in 0.85 percent aqueous sodium chloride solution a first thromboplastic material comprising a finely divided tissue residue resulting from the extraction of rabbit brain tissue with acetone; a second thromboplastic material prepared by the extraction at a temperature not greater than 25° C. of finely divided rabbit tissue selected from the class consisting of brain and lung tissue, with an aqueous solution buffered at a pH within the range of 5.5-6.5 and containing an alcohol selected from the group consisting of methanol and ethanol and mixtures thereof, in the amount of 5-20 percent by volume and 1-2 percent by weight of an amino acid having not more than nine carbon atoms, separation of the finely divided tissue from the extracting solution, dialysis of the extracting solution against distilled water and lyophilization of the dialysate; and a substance capable of increasing the activity of thromboplastic material prepared from prothrombin-free plasma selected from the class consisting of prothrombin-free horse, human, bovine, and rabbit plasma by adding at a temperature of −5° to −10° C. to the prothrombin-free plasma at a temperature of 5 to 0° C., about four volumes of a first aqueous alcohol solution buffered at a pH of 4.2-4.6 and containing about 25 percent by volume of an alcohol selected from the class consisting of methanol and ethanol and mixtures thereof, stirring and centrifuging the mixture, and separating the supernatant from the residue while the temperature is maintained at 0° to 5° C. and adding at a temperature of 0° to −5° C. to the residue at a temperature of 0° to −5° C., three to five volumes of a second aqueous alcohol solution buffered at a pH of 6.8 to 7.2 and containing about 16 percent by volume of an alcohol selected from the class consisting of methanol and ethanol and mixtures thereof and 5.4-5.8 percent by weight of an alkali metal salt of an amino acid having not more than six carbon atoms, stirring the mixture while the temperature is at 0° to −5° C., centrifuging the mixture, filtering the supernatant, and dialyzing the filtered supernatant against distilled water while the temperature is at 1° to 5° C., and lyophilizing the dialyzed supernatant; the suspension containing, for each ten milliliters of sodium chloride solution, 50-200 milligrams of the first thromboplastic material, 20-100 milligrams of the second thromboplastic material, and 5-100 milligrams of the substance capable of increasing the activity of thromboplastic material, incubating the suspension, centrifuging the incubated suspension, adding an amount of aqueous calcium chloride solution to the supernatant from the centrifugation sufficient to bring the calcium ion concentration therein to 0.004 to 0.015 molar, and centrifuging the supernatant containing calcium chloride.

3. A method for preparing a highly active, stable thromboplastic material comprising the steps of: suspending in 0.85 percent aqueous sodium chloride solution a first thromboplastic material comprising a finely divided tissue residue resulting from the extraction of rabbit brain tissue with acetone; a second thromboplastic material prepared by the extraction of finely divided rabbit tissue, selected from the class consisting of brain and lung tissue, with an aqueous solution buffered at a pH within the range of 5-8 and containing an alcohol, selected from the group consisting of methanol and ethanol and mixtures thereof, in the amount of 5-20 percent by volume and 0.01-6.0 percent by weight of an amino acid having not more than nine carbon atoms, separation of the finely divided tissue from the extracting solution, dialysis of the extracting solution against distilled water; and lyophilization of the dialysate; and a substance capable of increasing the activity of thromboplastic material prepared at a low temperature throughout from the prothrombin-free plasma selected from the class consisting of prothrombin-free horse, human, bovine, and rabbit plasma by adding to the prothrombin-free plasma three to five volumes of a first aqueous alcohol solution buffered at a pH of 4-5 and containing about 15-30 percent by volume of an alcohol selected from the class consisting of methanol and ethanol and mixtures thereof, stirring and centrifuging the mixture, separating the supernatant from the residue; and adding to the residue three to five volumes of a second aqueous alcohol solution buffered at a pH of 6-8 and containing 5-20 percent by volume of an alcohol selected from the class consisting of methanol and ethanol and mixtures thereof and 4-6 percent by weight of an alkali metal salt of an amino acid having not more than six carbon atoms, stirring and centrifuging the mixture, filtering the supernatant, dialyzing the filtered supernatant against distilled water, and lyophilizing the dialyzed supernatant; the suspension containing, for each ten milliliters of sodium chloride solution, 50-200 milligrams of the first thromboplastic material, 20-100 milligrams of the second thromboplastic material, and 5-100 milligrams of the substance capable of increasing the activity of thromboplastic material, incubating the suspension, centrifuging the incubated suspension, adding an amount of aqueous calcium chloride solution to the supernatant from the centrifugation sufficient to bring the calcium ion concentration therein to 0.004 to 0.015 molar, and centrifuging the supernatant containing calcium chloride; and lyophilizing the supernatant obtained from the latter centrifugation.

4. A method for preparing a highly active, stable thromboplastic material comprising the steps of: suspending in 0.85 percent aqueous sodium chloride solution a first thromboplastic material comprising a finely divided tissue residue resulting from the extraction of rabbit brain tissue with acetone; a second thromboplastic material prepared by the extraction at a temperature not greater than 25° C. of finely divided rabbit tissue selected from the class consisting of brain and lung tissue, with an aqueous solution buffered at a pH within the range of 5.5–6.5 and containing an alcohol selected from the group consisting of methanol and ethanol and mixtures thereof, in the amount of 5–20 percent by volume and 1–2 percent by weight of an amino acid having not more than nine carbon atoms, separation of the finely divided tissue from the extracting solution, dialysis of the extracting solution against distilled water and lyophilization of the dialysate; and a substance capable of increasing the activity of thromboplastic material prepared from prothrombin-free plasma selected from the class consisting of prothrombin-free horse, human, bovine, and rabbit plasma by adding at a temperature of −5° to −10° C. to the prothrombin-free plasma at a temperature of 5 to 0° C., about four volumes of a first aqueous alcohol solution buffered at a pH of 4.2–4.6 and containing about 25 percent by volume of an alcohol selected from the class consisting of methanol and ethanol and mixtures thereof, stirring and centrifuging the mixture, and separating the supernatant from the residue while the temperature is maintained at 0° to 5° C. and adding at a temperature of 0° to −5° C. to the residue at a temperature of 0° to −5° C., three to five volumes of a second aqueous alcohol solution buffered at a pH of 6.8 to 7.2 and containing about 16 percent by volume of an alcohol selected from the class consisting of methanol and ethanol and mixtures thereof and 5.4–5.8 percent by weight of an alkali metal salt of an amino acid having not more than six carbon atoms, stirring the mixture while the temperature is at 0° to −5° C., centrifuging the mixture, filtering the supernatant, and dialyzing the filtered supernatant against distilled water while the temperature is 1° to 5° C., and lyophilizing the dialyzed supernatant; the suspension containing, for each ten milliliters of sodium chloride solution, 50–200 milligrams of the first thromboplastic material, 20–100 milligrams of the second thromboplastic material, and 5–100 milligrams of the substance capable of increasing the activity of thromboplastic material, incubating the suspension, centrifuging the incubated suspension, adding an amount of aqueous calcium chloride solution to the supernatant from the centrifugation sufficient to bring the calcium ion concentration therein to 0.004 to 0.015 molar, and centrifuging the supernatant containing calcium chloride; and lyophilizing the supernatant obtained from the latter centrifugation.

5. A highly active, stable thromboplastic material prepared by a method comprising the steps of: suspending in 0.85 percent aqueous sodium chloride solution a first thromboplastic material comprising a finely divided tissue residue resulting from the extraction of rabbit brain tissue with acetone; a second thromboplastic material prepared by the extraction of finely divided rabbit tissue, selected from the class consisting of brain and lung tissue, with an aqueous solution buffered at a pH within the range of 5–8 and containing an alcohol, slected from the group consisting of methanol and ethanol and mixtures thereof, in the amount of 5–20 percent by volume and 0.01–6.0 percent by weight of an amino acid having not more than nine carbon atoms, separation of the finely divided tissue from the extracting solution, dialysis of the extracting solution against distilled water; and lyophilization of the dialysate; and a substance capable of increasing the activity of thromboplastic material prepared at a low temperature throughout from prothrombin-free plasma selected from the class consisting of pro-thrombin-free horse, human, bovine, and rabbit plasma by adding to the prothrombin-free plasma 3 to 5 volumes of a first aqueous alcohol solution buffered at a pH of 4–5 and containing about 15–30 percent by volume of an alcohol selected from the class consisting of methanol and ethanol and mixtures thereof, stirring and centrifuging the mixture, separating the supernatant from the residue; and adding to the residue three to five volumes of a second aqueous alcohol solution buffered at a pH of 6–8 and containing 5–20 percent by volume of an alcohol selected from the class consisting of methanol and ethanol and mixtures thereof and 4–6 percent by weight of an alkali metal salt of an amino acid having not more than six carbon atoms, stirring and centrifuging the mixture, filtering the supernatant, dialyzing the filtered supernatant against distilled water, and lyophilizing the dialyzed supernatant; the suspension containing, for each ten milliliters of sodium chloride solution, 50–200 milligrams of the first thromboplastic material, 20–100 milligrams of the second thromboplastic material, and 5–100 milligrams of the substance capable of increasing the activity of thromboplastic material, incubating the suspension, centrifuging the incubated suspension, adding an amount of aqueous calcium chloride solution to the supernatant from the centrifugation sufficient to bring the calcium ion concentration therein to 0.004 to 0.015 molar, and centrifuging the supernatant containing calcium chloride; and lyophilizing the supernatant obtained from the latter centrifugation.

6. A highly active, stable thromboplastic material prepared by the method comprising the steps of: suspending in 0.85 percent aqueous sodium chloride solution a first thromboplastic material comprising a finely divided tissue residue resulting from the extraction of rabbit brain tissue with acetone; a second thromboplastic material prepared by the extraction at a temperature not greater than 25° C. of finely divided rabbit tissue selected from the class consisting of brain and lung tissue, with an aqueous solution buffered at a pH within the range of 5.5–6.5 and containing an alcohol selected from the group consisting of methanol and ethanol and mixtures thereof, in the amount of 5–20 percent by volume and 1–2 percent by weight of an amino acid having not more than nine carbon atoms, separation of the finely divided tissue from the extracting solution, dialysis of the extracting solution against distilled water and lyophilization of the dialysate; and a substance capable of increasing the activity of thromboplastic material prepared from prothrombin-free plasma selected from the class consisting of prothrombin-free horse, human, bovine, and rabbit plasma by adding at a temperature of −5° to −10° C. to the prothrombin-free plasma at a temperature of 5 to 0° C., about four volumes of a first aqueous alcohol solution buffered at a pH of 4.2–4.6 and containing about 25 percent by volume of an alcohol selected from the class consisting of methanol and ethanol and mixtures thereof, stirring and centrifuging the mixture, and separating the supernatant from the residue while the temperature is maintained at 0° to 5° C. and adding at a temperature of 0° to −5° C. to the residue at a temperature of 0° to −5° C., three to five volumes of a second aqueous alcohol solution buffered at a pH of 6.8 to 7.2 and containing about 16 percent by volume of an alcohol selected from the class consisting of methanol and ethanol and mixtures thereof and 5.4–5.8 percent by weight of an alkali metal salt of an amino acid having not more than six carbon atoms, stirring the mixture while the temperature is at 0° to −5° C., centrifuging the mixture, filtering the supernatant, and dialyzing the filtered supernatant against distilled water while the temperature is 1° to 5° C., and lyophilizing the dialyzed supernatant; the suspension containing, for each ten milliliters of sodium chloride solution, 50–200 milligrams of the first thromboplastic material, 20–100 milligrams of the second thromboplastic material, and 5–100 milligrams of the substance capable of increasing the activity of thromboplastic material, incubating the suspension, centrifuging the incubated suspension, adding an amount of aqueous calcium chloride solution to the supernatant from the centrifugation sufficient to bring the calcium ion concentration therein to 0.004 to 0.015 molar, and centrifuging the supernatant containing calcium chloride; and lyophilizing the supernatant obtained from the latter centrifugation.

(References on following page)

References Cited in the file of this patent

UNITED STATES PATENTS

| | | |
|---|---|---|
| 2,162,863 | Ripke | June 20, 1939 |
| 2,349,316 | Volle | May 23, 1944 |

OTHER REFERENCES

Hodes: The Clinical Chemist, vol. 5, No. 4, August 1953 (Reprt. 3 pp.).

Howard: Modern Drug Encycl., 5th ed., 1952, p. 899.

Poncher: J. Lab. and Clin. Med., No. 27, December 1941, pp. 385–391, p. 387 pert.

Hardy: Chem. Abst., vol. 45, March 1951, p. 2046A.

Quick: The Hemorrhagic Diseases, 1942, pp. 64–67.

Wintrobe: Clin. Hematol., 2nd ed., 1946, Lea and Febiger, Phila, p. 208.

Cohn: J. A. C. S., vol. 68, March 1946, pp. 459–475 (pp. 462–472 pert.).

UNITED STATES PATENT OFFICE
CERTIFICATE OF CORRECTION

Patent No. 2,847,350                      August 12, 1958

Heron O. Singher et al.

It is hereby certified that error appears in the printed specification of the above numbered patent requiring correction and that the said Letters Patent should read as corrected below.

Column 8, line 22, after "aqueous" insert -- sodium --.

Signed and sealed this 21st day of October 1958.

(SEAL)

Attest:
KARL H. AXLINE
Attesting Officer

ROBERT C. WATSON
Commissioner of Patents